(12) United States Patent
Bell et al.

(10) Patent No.: US 11,136,144 B2
(45) Date of Patent: Oct. 5, 2021

(54) APPARATUS FOR SUPPORTING AN OBJECT ADJACENT TO AN AIRCRAFT

(71) Applicant: Gulfstream Aerospace Corporation, Savannah, GA (US)

(72) Inventors: Bret Bell, Savannah, GA (US); Coleda Darney, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 422 days.

(21) Appl. No.: 16/033,726

(22) Filed: Jul. 12, 2018

(65) Prior Publication Data

US 2020/0017239 A1    Jan. 16, 2020

(51) Int. Cl.
| | |
|---|---|
| *B64F 5/50* | (2017.01) |
| *B64F 5/10* | (2017.01) |
| *B64F 5/40* | (2017.01) |
| *B66F 5/04* | (2006.01) |

(52) U.S. Cl.
CPC .............. *B64F 5/50* (2017.01); *B64F 5/10* (2017.01); *B64F 5/40* (2017.01); *B66F 5/04* (2013.01)

(58) Field of Classification Search
CPC ...... B64F 5/50; B64F 5/10; B64F 5/40; B64F 5/00; B64F 5/60; B66F 3/36; B66F 3/38; B66F 5/00; B66F 5/04; B66C 23/48; B66C 23/485; Y10S 254/16
USPC .......................................... 254/134; 414/589
See application file for complete search history.

(56) References Cited

U.S. PATENT DOCUMENTS

| | | | | |
|---|---|---|---|---|
| 2,214,440 | A | * | 9/1940 | Rothery .................... B66F 3/30 |
| | | | | 254/93 H |
| 2,837,222 | A | * | 6/1958 | Trautman .................. B66F 3/42 |
| | | | | 414/589 |
| 2,838,278 | A | * | 6/1958 | Johnsen .................... B66F 5/04 |
| | | | | 254/134 |
| 2,849,124 | A | | 8/1958 | Warner |
| 3,603,545 | A | | 9/1971 | Boniface |
| 3,948,484 | A | * | 4/1976 | Tesinsky .................. B66F 13/00 |
| | | | | 254/134 |
| 4,946,222 | A | | 8/1990 | Matson |
| 5,203,540 | A | | 4/1993 | Lee |
| 5,338,015 | A | | 8/1994 | Liegel et al. |
| 5,641,201 | A | | 6/1997 | Casey et al. |
| 6,345,807 | B1 | | 2/2002 | Cacciatore |
| 6,547,509 | B1 | | 4/2003 | Edmo |
| 7,429,035 | B2 | * | 9/2008 | Metcalf ................... B66C 23/48 |
| | | | | 248/125.2 |
| 8,794,161 | B2 | | 8/2014 | Lu et al. |

(Continued)

*Primary Examiner* — Lee D Wilson
*Assistant Examiner* — Seahee Hong
(74) *Attorney, Agent, or Firm* — LKGlobal | Lorenz & Kopf, LLP

(57) ABSTRACT

Apparatuses for supporting an object adjacent to an aircraft are provided. In one example, an apparatus for supporting an object adjacent to an aircraft includes a rotational tray assembly that includes a support subassembly. A platform subassembly is pivotally coupled to the support subassembly and is configured to support the object. A drive screw subassembly is operatively coupled to the platform subassembly and the support subassembly to move the platform subassembly relative to the support subassembly. The rotational tray assembly is configured to couple to a lift to position the rotational tray assembly adjacent to the aircraft.

18 Claims, 14 Drawing Sheets

(56) References Cited

U.S. PATENT DOCUMENTS

| | | |
|---|---|---|
| 9,150,394 B2 | 10/2015 | Fourney et al. |
| 9,593,001 B2 | 3/2017 | Frizzell |
| 2003/0180130 A1 | 9/2003 | Lutz |
| 2005/0152772 A1 | 7/2005 | Hawkins, III |
| 2005/0220583 A1 | 10/2005 | Lutz |
| 2007/0160451 A1 | 7/2007 | Gencarelli |
| 2009/0301357 A1 | 12/2009 | Fourney et al. |
| 2014/0182488 A1 | 7/2014 | Lu et al. |
| 2015/0368079 A1 | 12/2015 | Scholfield et al. |

* cited by examiner

APPARATUS FOR SUPPORTING AN OBJECT ADJACENT TO AN AIRCRAFT

TECHNICAL FIELD

The technical field relates generally to installing, removing, and/or servicing of a component or the like of an aircraft, and more particularly, relates to an apparatus for supporting an object adjacent to an aircraft for installing, removing, and/or servicing the object or other component, for example, which is supported by the object.

BACKGROUND

In the aircraft industry, various components or the like are installed and/or removed from an aircraft, and/or require service maintenance during the life of the aircraft. In one example, a small laser transmitter assembly (SLTA), which is a countermeasure device used to detect a missile that is fired at an aircraft, is installed or removed from the tail end section of the aircraft using an automotive transmission jack. For installation, a fixture supporting the SLTA unit is raised vertically adjacent to the aircraft under the tail end section of the aircraft by the automotive transmission jack. A mechanic or other service personnel is raised vertically on a scissor lift adjacent to the automotive transmission jack to a height about level with the fixture and SLTA unit. Because the tail end section of the aircraft typically tapers inwardly from the main body of the fuselage at about a 30° to 40° angle, the mechanic needs to lie down on a scissor lift and manipulate the automotive transmission jack to an angle that substantially matches the angle of the inward taper of the tail end section of the aircraft to properly tilt or otherwise orient the SLTA unit for installation to the aircraft. Once the angle of the automotive transmission jack has been adjusted, the mechanic then stands up on the scissor lift and proceeds to attach the SLTA unit to the tail end section of the aircraft and decouple the fixture from the SLTA unit. Removing the SLTA unit from the aircraft requires a similar series of steps with some of the above described steps being performed in reverse or altered order(s). Unfortunately, such a sequence of steps to change the angle of the automotive transmission jack for installing, removing, and/or servicing the SLTA unit or other like component(s), e.g., an integrated drive generator (IDG) or the like, is cumbersome and inefficient for the mechanic.

Accordingly, it is desirable to provide an apparatus for supporting an object adjacent to an aircraft for installing, removing, and/or servicing the object or other component supported by the object in which the angle of at least a portion of the apparatus supporting the object can be easily and efficiently adjusted. Furthermore, other desirable features and characteristics of the various embodiments described herein will become apparent from the subsequent detailed description and the appended claims, taken in conjunction with the accompanying drawings and this background.

SUMMARY

Apparatuses for supporting an object adjacent to an aircraft are provided herein. In an exemplary embodiment, an apparatus for supporting an object adjacent to an aircraft includes, but is not limited to, a rotational tray assembly that includes a support subassembly. The apparatus further includes, but is not limited to, a platform subassembly that is pivotally coupled to the support subassembly and is configured to support the object. The apparatus further includes, but is not limited to, a drive screw subassembly that is operatively coupled to the platform subassembly and the support subassembly to move the platform subassembly relative to the support subassembly. The rotational tray assembly is configured to couple to a lift to position the rotational tray assembly adjacent to the aircraft.

In another exemplary embodiment, an apparatus for supporting an object adjacent to an aircraft includes, but is not limited to, a rotational tray assembly that includes a support subassembly. The apparatus further includes, but is not limited to, a platform subassembly that is pivotally coupled to the support subassembly and is configured to support the object. The apparatus further includes, but is not limited to, a drive screw subassembly that is operatively coupled to the platform subassembly and the support subassembly to move the platform subassembly relative to the support subassembly. The apparatus further includes, but is not limited to, a support structure that is coupled to the support subassembly and extends therefrom from in a direction away from the platform subassembly. The apparatus further includes, but is not limited to, a lift that is coupled to the support structure and is configured to vertically move the rotational tray assembly.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to apparatuses for supporting an object adjacent to an aircraft for installing, removing, and/or servicing the object or other component that is supported by the object. The apparatus includes a rotational tray assembly that includes a support subassembly. A platform subassembly is pivotally coupled to the support subassembly and is configured to support the object. A drive screw subassembly is operatively coupled to the platform subassembly and the support subassembly to move the platform subassembly relative to the support subassembly. A support structure is coupled to the support subassembly and extends therefrom from in a direction away from the platform subassembly. A lift is coupled to the support structure and is configured to vertically move the rotational tray assembly upward and downward.

In an exemplary embodiment, an object is loaded onto the platform subassembly which is oriented in a substantially horizontal position. The lift moves the rotational tray assembly including the platform subassembly vertically adjacent to an outer section of an aircraft. A mechanic or other service personnel may be lifted vertically, for example via a scissor lift or other lift device, adjacent to the elevated platform subassembly. Advantageously, in an exemplary embodiment, the drive screw subassembly includes a manual drive element that is actuated or otherwise easily moved by the mechanic or other service personnel to rotate the drive screw subassembly, thereby moving (e.g., rotating) the platform subassembly from the substantially horizontal position to a desired tilted position. In the tilted position, the rotational tray assembly statically supports the object in a desired orientation adjacent to the aircraft, for example, to facilitate installing, removing, and/or servicing of the object or other component that is supported by the object.

Figure 1:
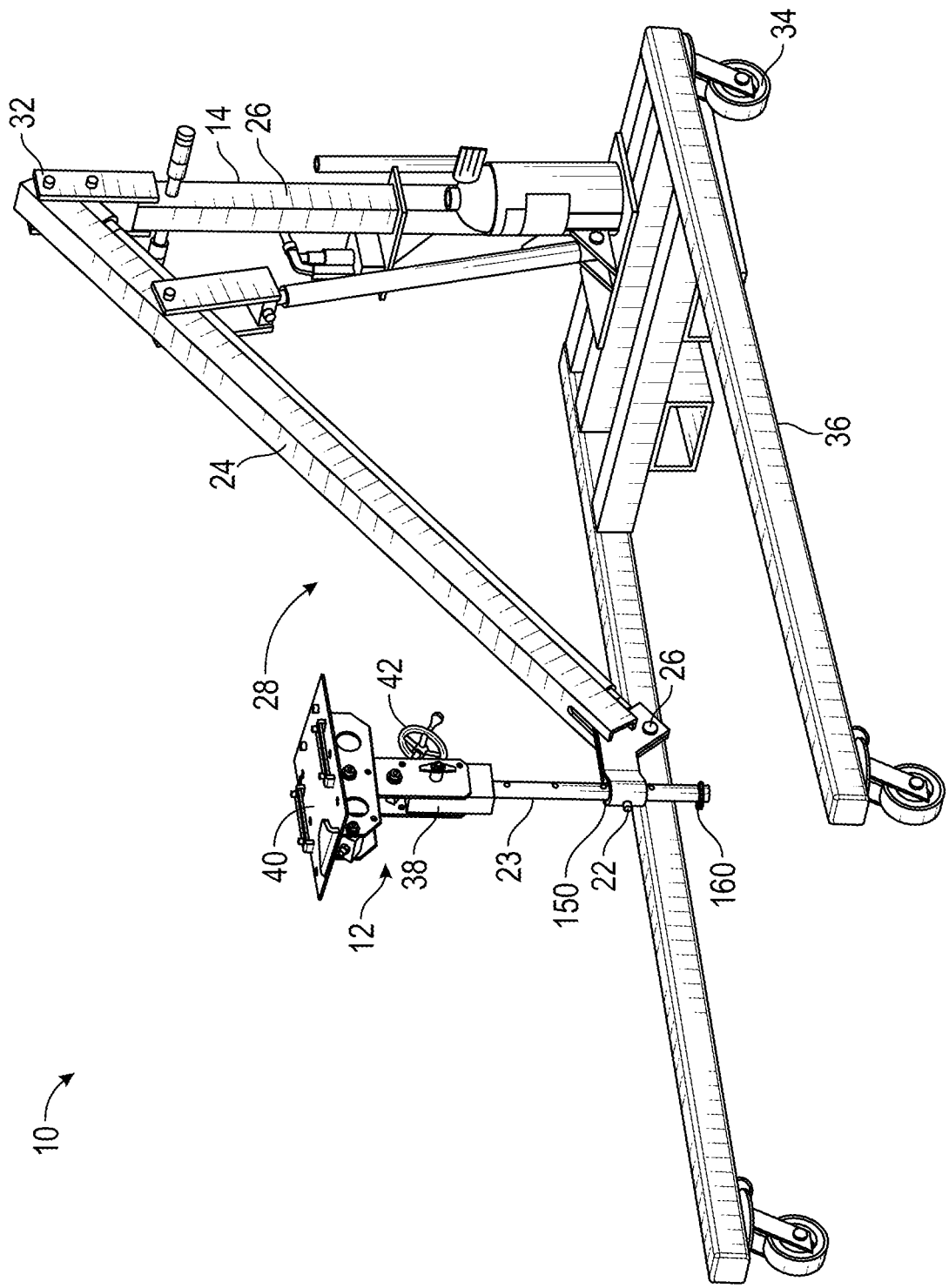
FIG. 1 illustrates a perspective view of an apparatus including a rotational tray assembly and a lift for positioning an object adjacent to an aircraft in accordance with an exemplary embodiment.
Figure 2:
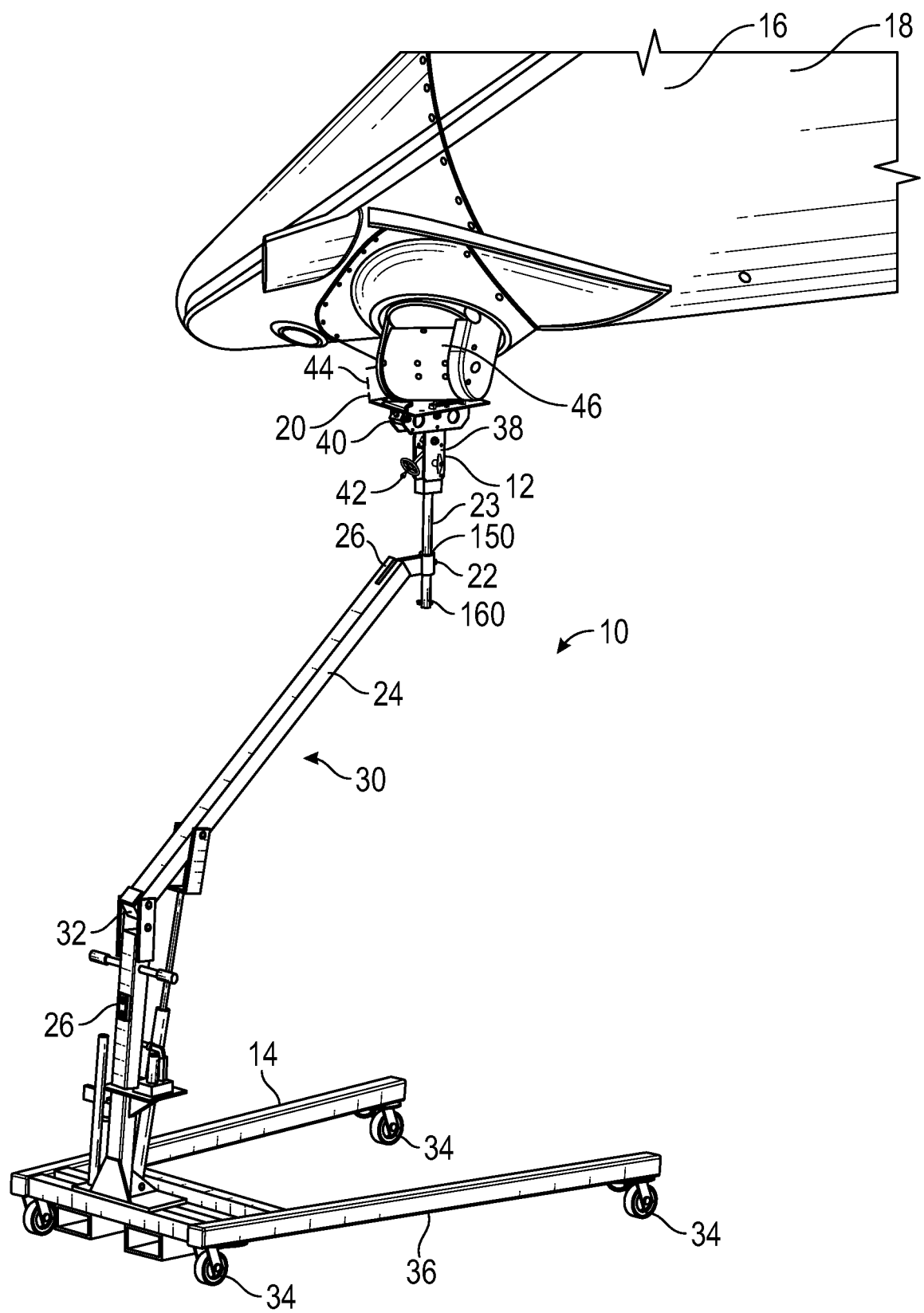
FIG. 2 illustrates a perspective view of a tail end section of an aircraft and an apparatus positioning an object adjacent to the tail end section of the aircraft in accordance with an exemplary embodiment.
Figure 3:
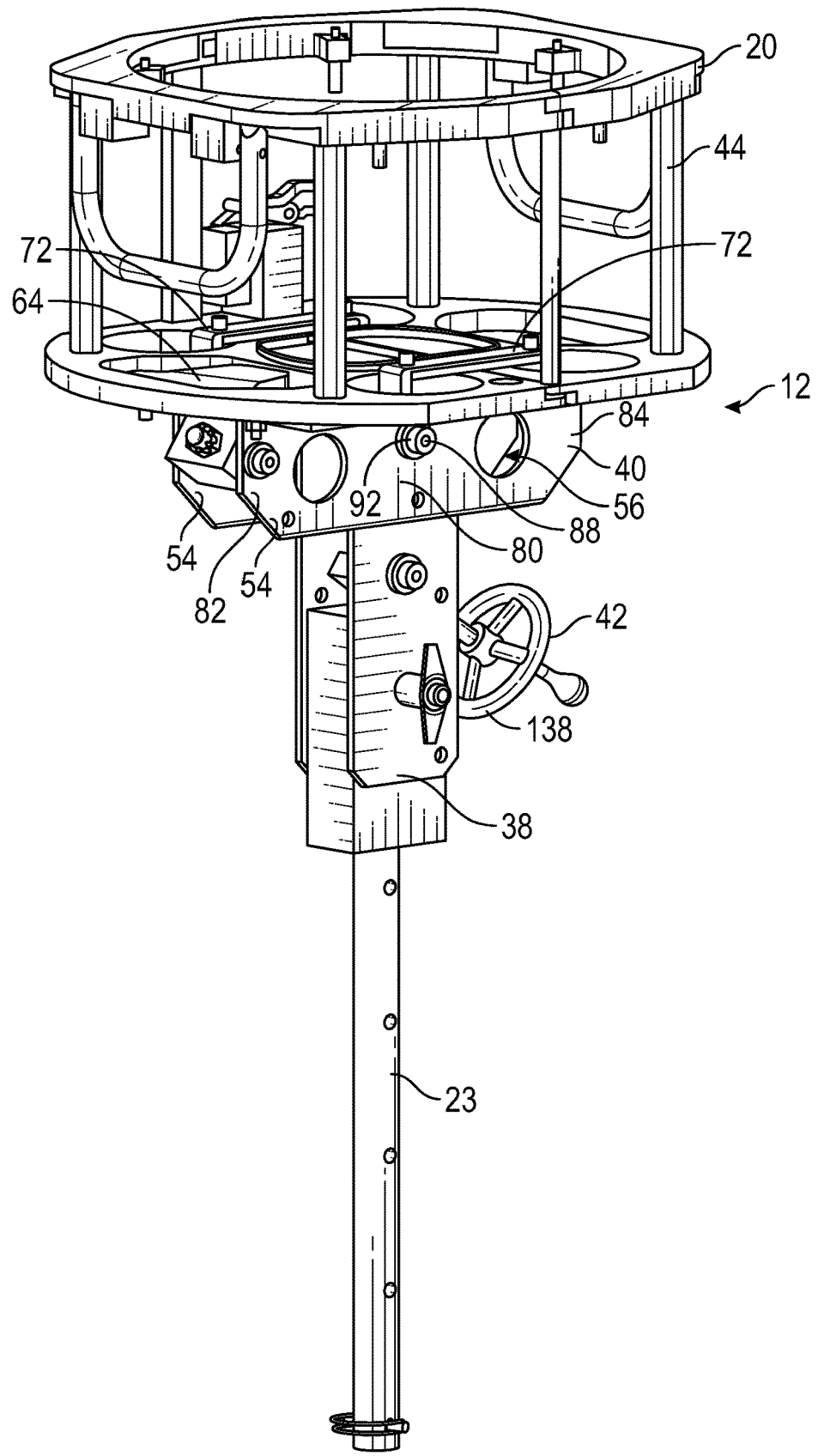
FIG. 3 illustrates a perspective view of an object supported on a rotational tray assembly in accordance with an exemplary embodiment.
Figure 4:
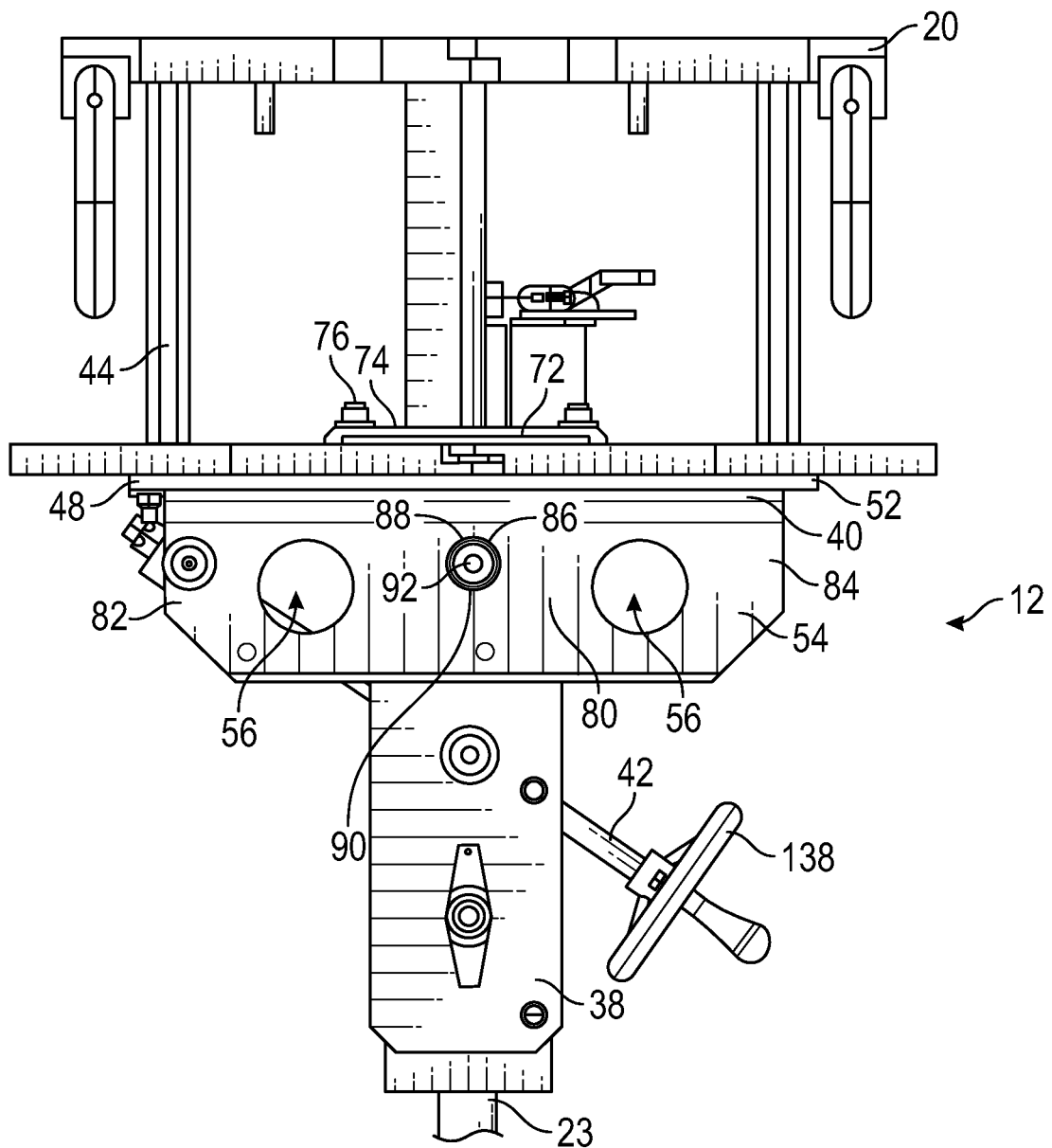
FIG. 4 illustrates a side view of an object supported on a rotational tray assembly in accordance with an exemplary embodiment.
Figure 5:
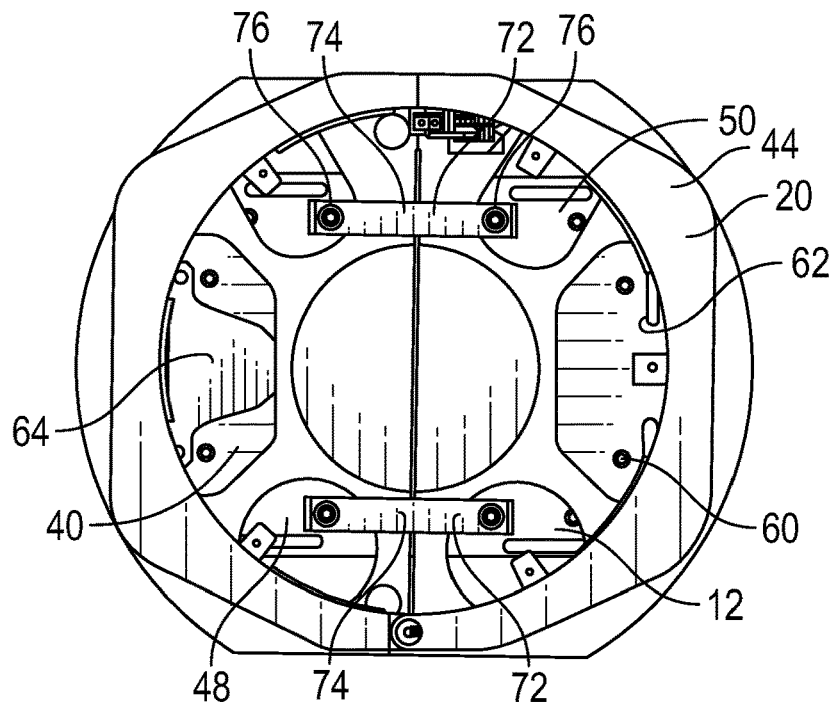
FIG. 5 illustrates a top view of an object supported on a rotational tray assembly in accordance with an exemplary embodiment.
Figure 6:
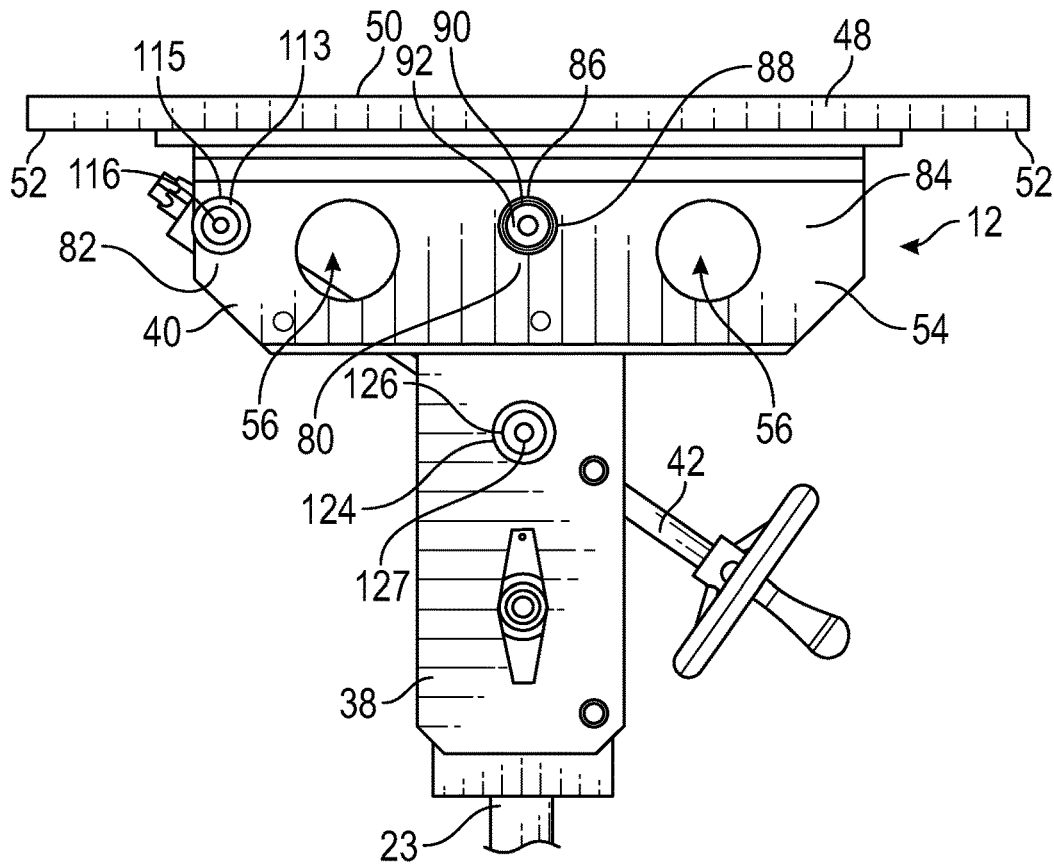
FIG. 6 illustrates a side view of a rotational tray assembly in accordance with an exemplary embodiment.

FIG. 1 illustrates a perspective view of an apparatus 10 including a rotational tray assembly 12 and a lift 14 in accordance with an exemplary embodiment. FIG. 2 illustrates a perspective view of a tail end section 16 of an aircraft 18 and the apparatus 10 supporting an object 20 adjacent to the tail end section 16 of the aircraft 18 in accordance with an exemplary embodiment.

As illustrated, the lift 14 includes a holding member 22, e.g. sleeve, ring, cup, or other retaining member, that holds a "shaft-like" support structure 23 of the rotational tray assembly 12 in a substantially upright or vertical orientation. As will be discussed in further detail below, in an exemplary embodiment, the support structure 23 is removably coupled to and positionally adjustable in the holding member 22.

The holding member 22 is pivotally coupled to a pivot arm 24 of the lift 14 to maintain the support structure 23 in the substantially upright or vertical orientation as the pivot arm 24 moves from a retracted position 28 (as shown in FIG. 1) vertically upward to an extended position 30 (as shown in FIG. 2) adjacent to the tail end section 16 of the aircraft 18. The pivot arm 24 is pivotably coupled to a support body 26 about a pivot point 32 to move between the retracted and extended positions 28 and 30 (e.g., vertically upward and/or downward). The lift 14 may also include wheels 34 that are attached to a base frame 36 that supports the support body 26 to allow the lift 14 to be moved along the floor, platform, or other relatively horizontal or sloped surface by applying manual force (e.g., pushing and/or pulling) to the lift 14.

In an exemplary embodiment, the lift 14 is a universal lift and movement of the pivot arm 24 may be achieved by application of pressure to the pivot arm 24, thereby rotating the pivot arm 24 upward. The application of pressure can be hydraulic, pneumatic, or mechanical. Depending on the power system employed on the lift 14, it may require no power to lower (e.g., rotate downward) the pivot arm 24, but rather just the force of gravity and a simple release of hydraulic or pneumatic pressure. Universal lifts are commercially available under the trade name Tronair® Universal Lifts, which are manufactured by Tronair Inc., located at 1 Air Cargo Parkway East, Swanton, Ohio 43558. Other types of lifts known to those skilled in the art may be used to move the rotational tray assembly 12 vertically upward and downward.

Referring also to FIGS. 3-6, in addition to the support structure 23 as discussed above, the rotational tray assembly 12 further includes a support subassembly 38, a platform subassembly 40 pivotally coupled to the support subassembly 38, and a drive screw subassembly 42 operatively coupled to the platform subassembly 40 and the support subassembly 38 to move (e.g., pivot, tilt, or otherwise rotate) the platform subassembly 40 relative to the support subassembly 38. The support structure 23 is coupled to the support subassembly 38 and extends therefrom in a direction away from the platform subassembly 40.

The platform subassembly 40 is configured to support the object 20 adjacent to the aircraft 18 for installing, removing, and/or servicing the object 20 or other component that is supported by the object 20. In an exemplary embodiment and as illustrated in FIGS. 2-5, the object 20 is a fixture 44 that is used to support a component 46, such as a SLTA unit, generator (e.g., IDG) or the like, for installing and/or removing the component 46 to or from the aircraft 18, and/or for servicing the component 46.

Referring to FIGS. 3-7B, the platform subassembly 40 includes a plate 48 having an upper surface 50 for supporting the object 20 and a lower surface 52 that is disposed on a side opposite the upper surface 50. Support beams 54 are disposed adjacent to the lower surface 52, spaced apart and coupled to the plate 48. The support beams 54 may include a plurality of openings 56 formed therethrough to reduce the weight of the platform subassembly.

The plate 48 has a plurality of openings formed therethrough including through holes 60 and slots 62 for securing the object 20 to the plate 48. In an exemplary embodiment, the object 20 is placed on the upper surface 50 of the plate 48 and is positioned against at least one index plate 64 disposed on the upper surface 50. The index plate 64 has positive features 66 (e.g., integrally formed or separate threaded posts or fasteners) that extend through the corresponding through holes 60 in the plate 48 and are secured to the plate 48 via threaded retainers 68 (e.g., threaded nut or the like) arranged on the positive features 66. In an exemplary embodiment, the index plate 64 has a sidewall 70 that interfaces with an abutting portion or edge of the object 20 to facilitate positioning the object 20 on the plate 48 and further, to limit movement of the object 20 relative to the plate 48 when the platform subassembly 40 moves (e.g., rotates) relative to the support subassembly 38 as will be discussed in further detail below.

In an exemplary embodiment, after positioning the object 20 on the upper surface 50 against the index plate 64, the object 20 is secured to the plate 48 using one or more clamps 72. As illustrated, the clamps 72 each have a substantially C-shaped" body 74 that correspondingly engages a portion of the object 20 and have positive features 76 (e.g., integrally formed or separate threaded posts or fasteners) that extend through the corresponding through holes 60 in the plate 48 and are secured to the plate 48 via threaded retainers 68 (e.g., threaded nut or the like) arranged on the positive features 76. Alternatively, or in addition to using the clamps 72, one or more straps 78 may be wrapped around the object 20 and disposed through the slots 62 to secure the object 20 to the plate 48.

As illustrated, the support beams 54 each have an intermediate section 80 disposed between end sections 82 and 84. The intermediate sections 80 of the support beams 54 have openings 86 extending therethrough. As will be discussed in further detail below, the openings 86 are used to define a pivot point 88 for pivotably coupling the platform subassembly 40 to the support assembly 38.

Figure 8:
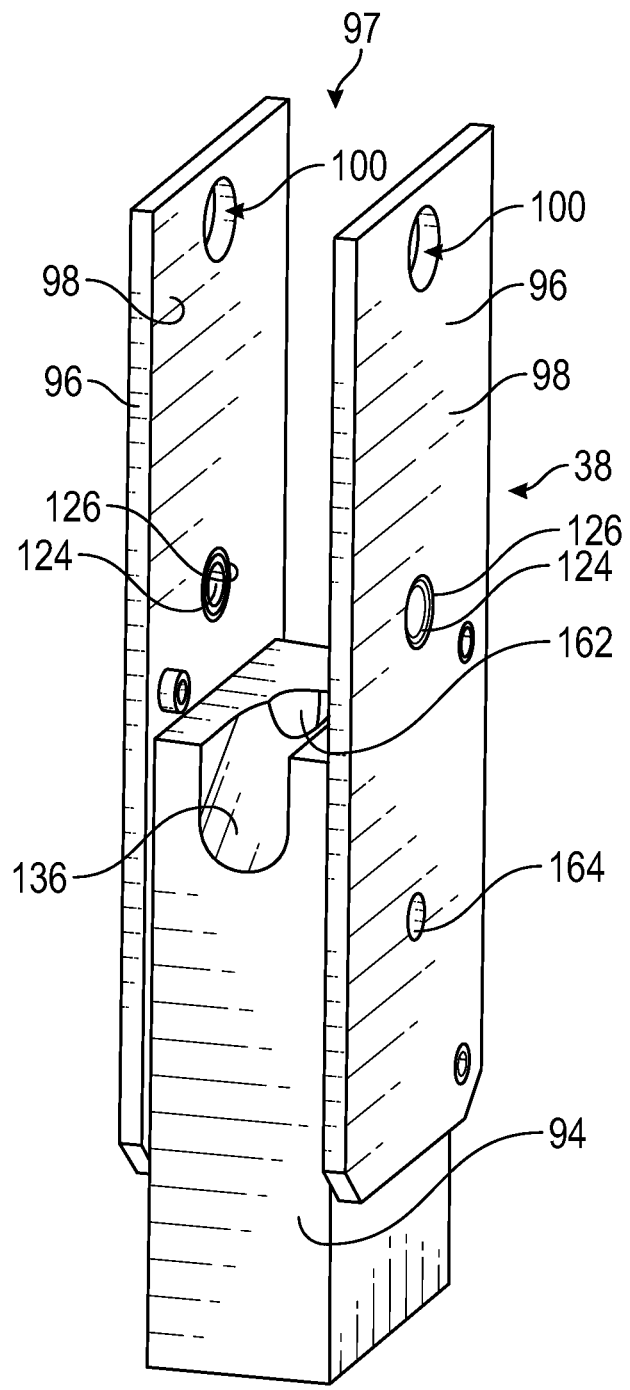
FIG. 8 illustrates a perspective view of a portion of a rotational tray assembly in accordance with an exemplary embodiment.

Referring also to FIG. 8, in an exemplary embodiment, the support subassembly 38 includes a support block 94 and support plates 96 that are coupled to opposing sides of the support block 94. The support plates 96 extend distally (e.g., upward) from the support block 94 to define a space 97 between the distal end portions 98 of the support plates 96 for the drive screw subassembly 42. Each of the support plates 96 include an opening 100 extending through the distal end portions 98 and that are aligned with the openings 86 formed in the intermediate sections 80 of the support beams 54. As illustrated, a bushing 90 is disposed through each of the aligned openings 86 and 100 and a threaded fastener 92 (e.g., shoulder screw, washer, and loc nut) is disposed through each of the bushings 90 to pivotably couple the support beams 54 to the distal end portions 98 of the support plates 96, thereby defining the pivot point 88.

Figure 9:
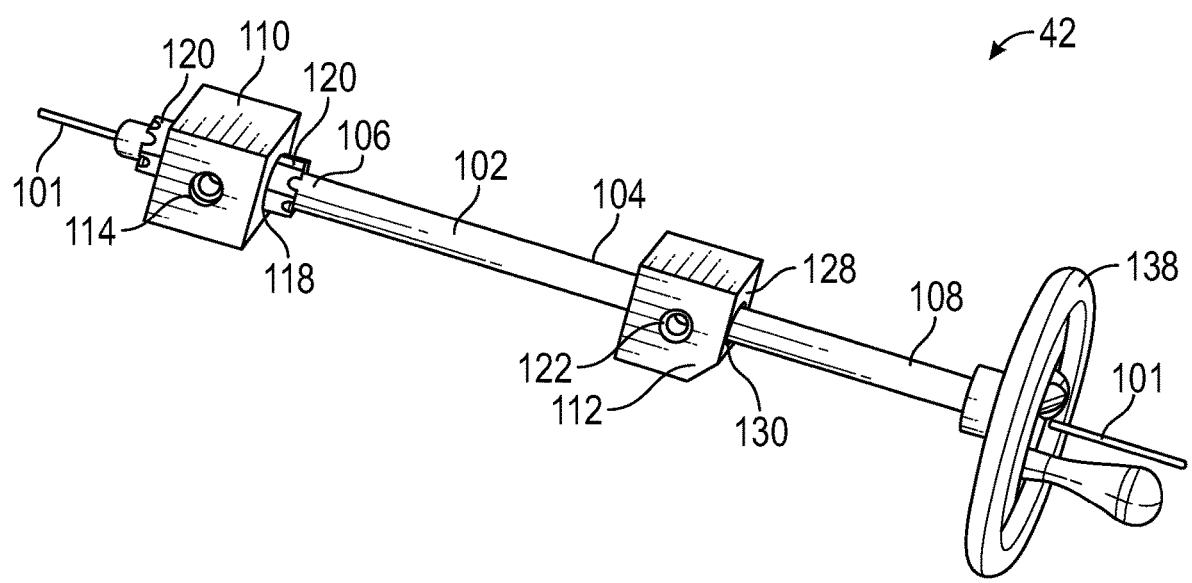
FIG. 9 illustrates a perspective view of a portion of a rotational tray assembly in accordance with an exemplary embodiment.
Figure 10:
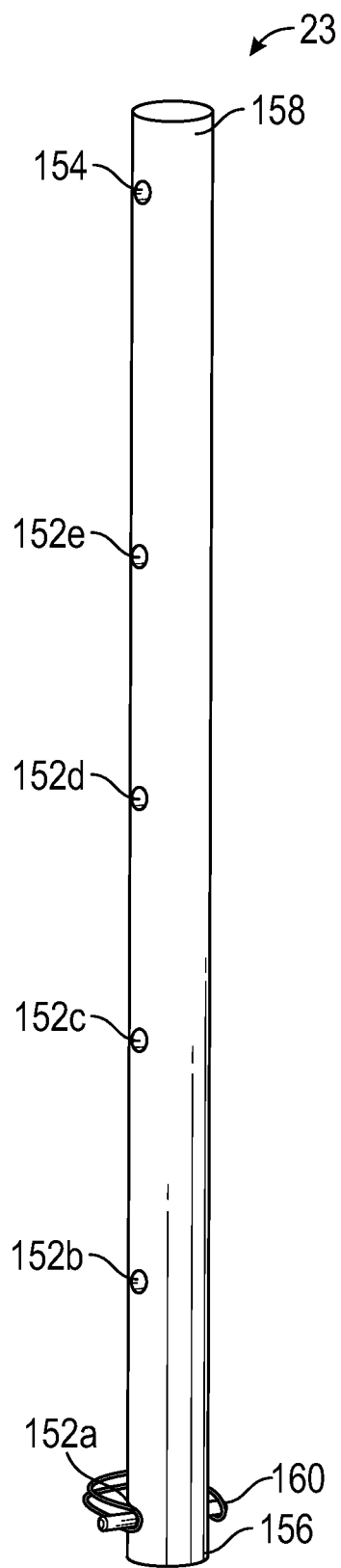
FIG. 10 illustrates a perspective view of a portion of a rotational tray assembly in accordance with an exemplary embodiment.

Referring also to FIG. 9, in an exemplary embodiment, the drive screw subassembly 42 is coupled to the support plates 96 of the support subassembly 38 and independently, to the end sections 82 of the support beams 54 of the platform subassembly 40. As illustrated, the drive screw subassembly 42 includes blocks 110 and 112, and a threaded rod 102 disposed through the blocks 110 and 112. The threaded rod 102 has a longitudinal axis 101 about which the threaded rod 102 rotates and includes an intermediate rod section 104 that is disposed between rod end sections 106 and 108. The blocks 110 and 112 are spaced apart from each other and are disposed about the rod end section 106 and the intermediate rod section 104, respectively.

In an exemplary embodiment, the block 110 has a block opening 118 with the rod end section 106 disposed therein. The block opening 118 is a clearance opening sized to provide clearance between the block 110 and the rod end section 106. Additionally, castle nuts and cotter pins 120 are used to retain the axial position of the rod end section 106 within the block opening 118. As such, when the threaded rod 102 rotates about the longitudinal axis 101, there is clearance between the block 110 and the threaded rod 102 to allow the threaded rod 102 to rotate while the castle nuts and cotter pins 120 prevent the rod end section 106 from moving axially relative to the block 110 so as to anchor the rod end section 106 to the block 110.

The block 110 is pivotally coupled to the end sections 82 of the support beam 54. In an exemplary embodiment, the block 110 has lateral taped openings 114 on opposing lateral sides of the block 110 that aligned with openings 115 formed through the support beams 54. A press-fit bushing 113 with a threaded fastener 116, which can rotate within the press-fit bushing 113, are disposed through each the openings 115 of the support beams 54 with the threaded fastener 116 extending into the corresponding lateral taped opening 114 to couple the end sections 82 of the support beams 54 of the platform subassembly 40 with the block 110 of the drive screw subassembly 42.

The block 112 is pivotally coupled to the support plates 96. In an exemplary embodiment, the block 112 has lateral taped openings 122 on opposing lateral sides of the block 112 that aligned with openings 124 formed through the of the support plates 96. A press-fit bushing 126 with a threaded fastener 127, which can rotate within the press-fit bushing 126, are disposed through each the openings 124 of the support plates 96 with the threaded fastener 127 extending into the corresponding lateral taped opening 122 to couple the support plates 96 of the support subassembly 38 with the block 112 of the drive screw subassembly 42.

As discussed above, the block 112 is disposed about the intermediate rod section 104 of the threaded rod 102. In an exemplary embodiment, the block 112 has a threaded wall 128 defining a threaded block opening 130 that is sized such that when the threaded rod 102 rotates about the longitudinal axis 101, the threads of the threaded rod 102 mesh or otherwise engage the threaded wall 128 to advance the threaded rod 102 through the threaded block opening 130.

Figure 11A:
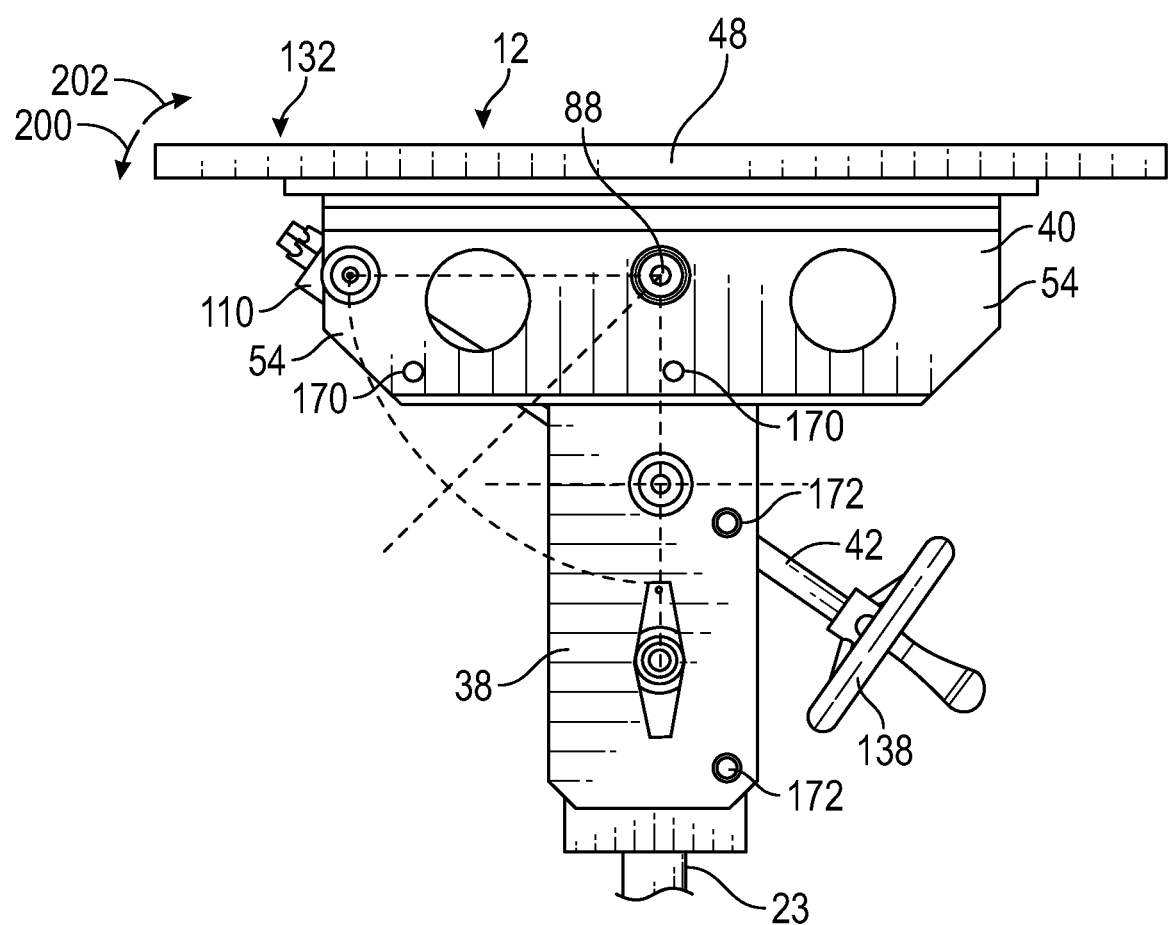
FIG. 11A illustrates a side view of a rotational tray assembly including a platform subassembly oriented at a substantially horizontal position in accordance with an exemplary embodiment.
Figure 11B:
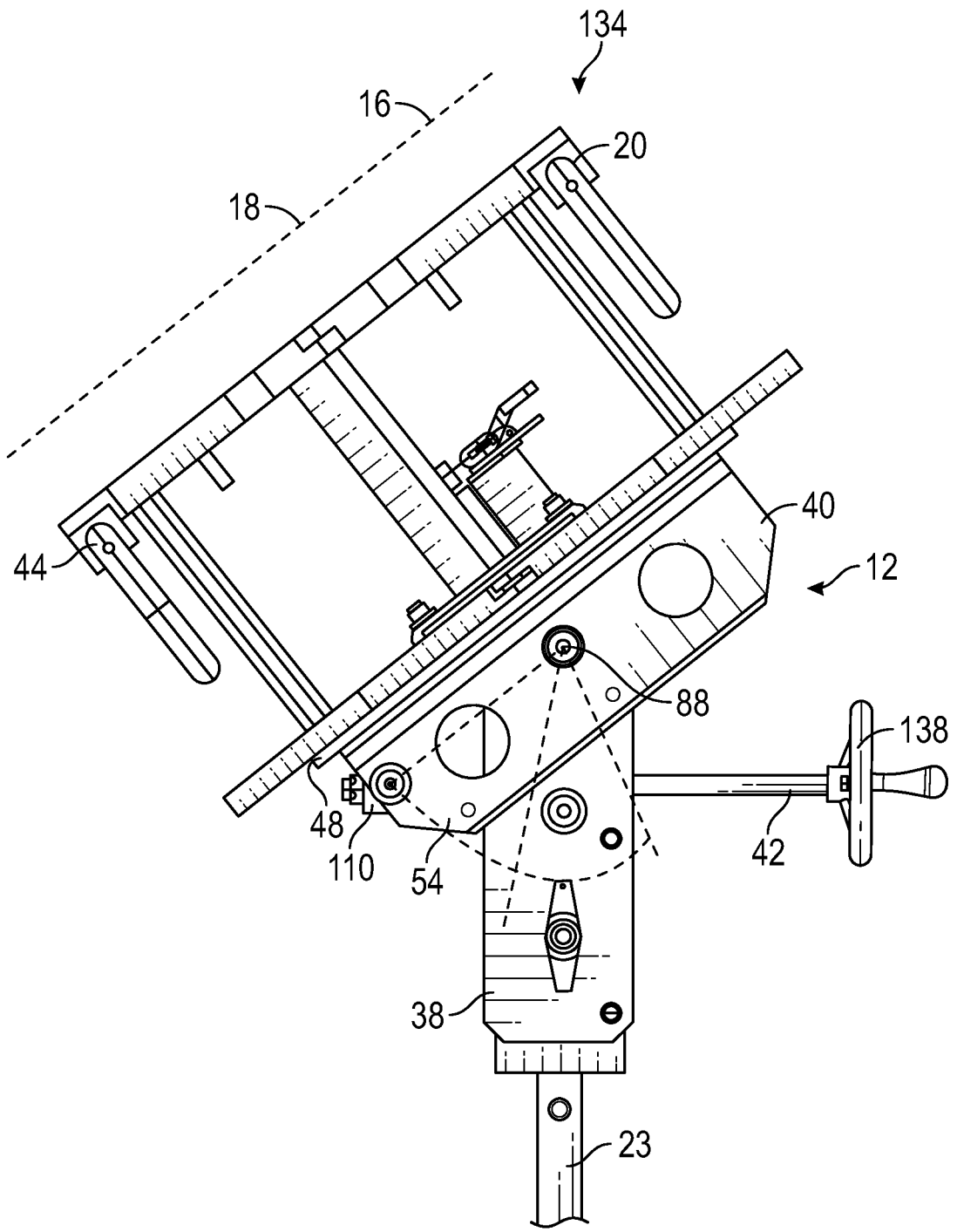
FIG. 11B illustrates a side view of a rotational tray assembly including a platform subassembly oriented at a tilted position in accordance with an exemplary embodiment.
Figure 12:
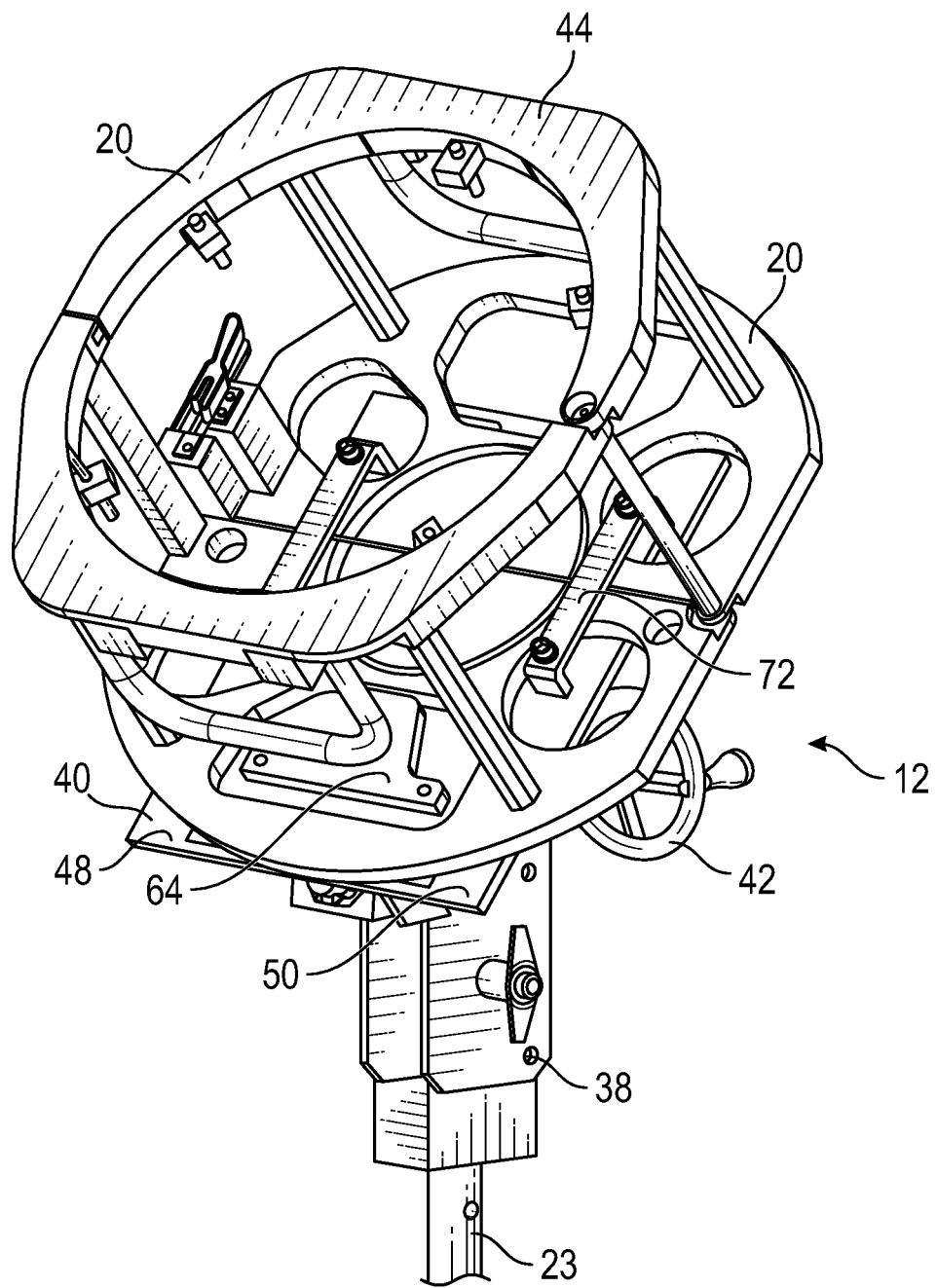
FIG. 12 illustrates a perspective view of a rotational tray assembly including a platform subassembly oriented at a tilted position in accordance with an exemplary embodiment.

Referring also to FIGS. 11A-12, as discussed above, the intermediate section 80 of the support beams 54 are pivotally coupled to the distal end portion 98 of the support plates 96 about the pivot point 88. Depending upon the direction of rotation of the threaded rod 102 about the longitudinal axis 101, the threaded rod 102 advances through the threaded block opening 130 in either a direction towards the block 110 or a direction opposite the block 110. In an exemplary embodiment, to rotate the platform subassembly 40 from a substantially horizontal position 132 (show in FIG. 11A) to a tilted position 134 (shown in FIGS. 11B-12), the threaded rod 102 is rotated in a first direction (e.g., either clockwise or counterclockwise) about the longitudinal axis 101 and the threaded rod 102 engages the threaded wall 128 to advance the threaded rod 102 through the threaded block opening 130 in a direction opposite the block 110, thereby pulling the block 110 together with the end sections 82 of the support beams 54 towards the block 112 to rotate the platform subassembly 40 in a direction (indicated by single headed arrow 200) about the pivot point 88. Alternatively, to rotate the platform subassembly 40 from the tilted position 134 towards the substantially horizontal position 132, the threaded rod is rotated in a second direction (e.g., either counterclockwise or clockwise) opposite the first direction and the threaded rod 102 engages the threaded wall 128 to advance the threaded rod 102 through the threaded block opening 130 in a direction towards the block 110, thereby pushing the block 110 together with the end sections 82 of the support beams 54 away from the block 112 to rotate the platform subassembly 40 in a direction (indicated by single headed arrow 202) about the pivot point 88.

In an exemplary embodiment, and as illustrated, the platform subassembly 40 is rotated from the substantially horizontal position 132 to the tilted position 134 that substantially matches the angle of the tail end section 16 of the aircraft 18. In one example, the platform subassembly 40 in the tilted position 134 is oriented at an angle of from about 30 to about 40° relative to the substantially horizontal position 132 to substantially match the angle of the tail end section 16 of the aircraft. The illustrated angle however is non-limiting and it is to be understood that the platform subassembly 40 may be rotated to an angle of less than 30° or more than 40°.

In an exemplary embodiment, the support block 94 includes a clearance relief 136 (e.g., angled channel, cut-out, or the like) that provides additional clearance in the space 97 between the threaded rod 102 and the support block 94 to allow the threaded rod 102 to move relative to the support subassembly 38 as the platform subassembly 40 is rotated. For example, a larger or deeper clearance relief 136 allows the platform subassembly 40 to be rotated to an angle of greater and 40°, while a smaller or shallower clearance relief 136 may only be required for the platform subassembly 40 rotating to an angle of less than 30°.

As illustrated, the drive screw subassembly 42 includes a manual drive element 138 (e.g., steering wheel, handle, or the like) operatively coupled to the rod end section 108 of the threaded rod 102. When the manual drive element 138 is actuated or otherwise moved (e.g., rotated, turned, or the like), the threaded rod 102 rotates about the longitudinal axis 101. Advantageously, in an exemplary embodiment, the manual drive element 138 is positioned to be readily accessible by a mechanic or other service personnel to be manually moved to rotate the threaded rod 102, thereby rotating the platform subassembly 40 from the substantially horizontal position 132 to the desired tilted position 134. In the tilted position 134, the rotational tray assembly 12 statically supports the object 20 in a desired orientation adjacent to the aircraft 18, for example, to facilitate installing, removing, and/or servicing of the object 20 or other component that is supported by the object 20.

Referring to FIGS. 1-6 and 10, as discussed above, the support structure 23 is removably coupled to and positionally adjustable (e.g., height extending upward from the holding member 22 can be adjusted) in the holding member 22. In an exemplary embodiment, the holding member 22 is configured as a sleeve or a cup with an opening 150 (see FIGS. 1-2) formed therethrough. The support structure 23 is configured as an elongated element (e.g., shaft, rod or the like) that is disposed through the opening 150 of the holding member 22. The support structure 23 has a plurality of holes 152a-e and 154 spaced apart between the lower end 156 and the upper end 158. A locking pin with a wire retainer 160, which is removable, is positioned in the hole 152a to prevent the support structure 23 from inadvertently being pulled out of the holding member 22 unless the locking pin and wire retainer 160 are removed. Depending upon the desired height of the rotational tray assembly 12 from the lift 14, the position of the support structure 23 can be adjusted to align with any one of the holes 152b-e with a corresponding hole in the holding member 22, and a ball lock pin may be placed through the desired hole 152b-e to selectively lock the position of the support structure 23 in the holding member 22.

Referring also to FIG. 8, in an exemplary embodiment, the support structure 23 is coupled to the support block 94 of the support subassembly 38. As illustrated, the support block 94 includes openings 162 and 164. As illustrated, the opening 164 is also formed through the support plates 96. The support structure 23 is disposed in the opening 162 with the hole 154 of the support structure 23 aligned with the opening 164 and a ball lock pin 166 is positioned through the opening 164 and the hole 154 to removably coupled the support structure 23 with the support subassembly 38.

Figure 7A:
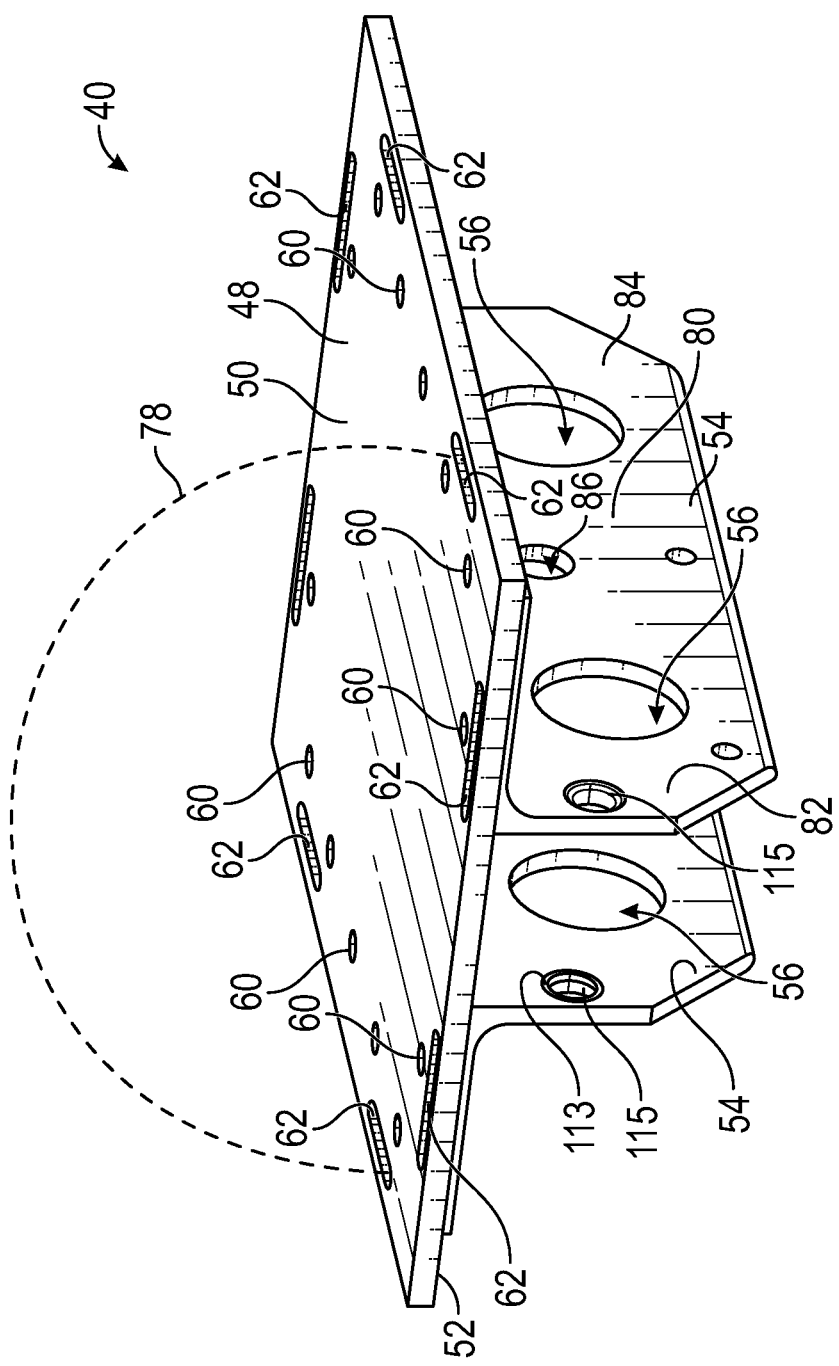
FIG. 7A illustrates a perspective view of a portion of a rotational tray assembly in accordance with an exemplary embodiment.
Figure 7B:
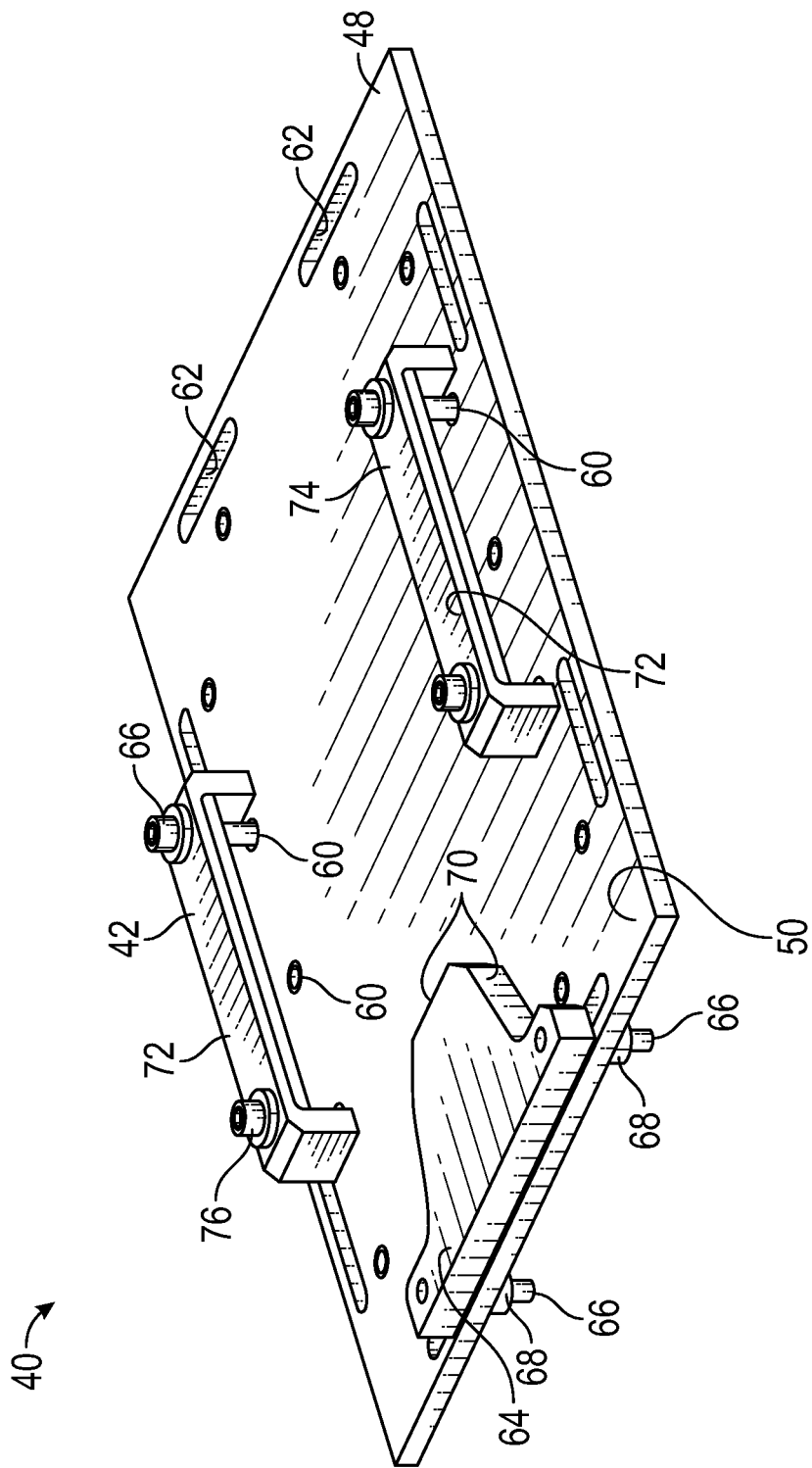
FIG. 7B illustrates a perspective view of a portion of a rotational tray assembly in accordance with an exemplary embodiment.
Figure 13:
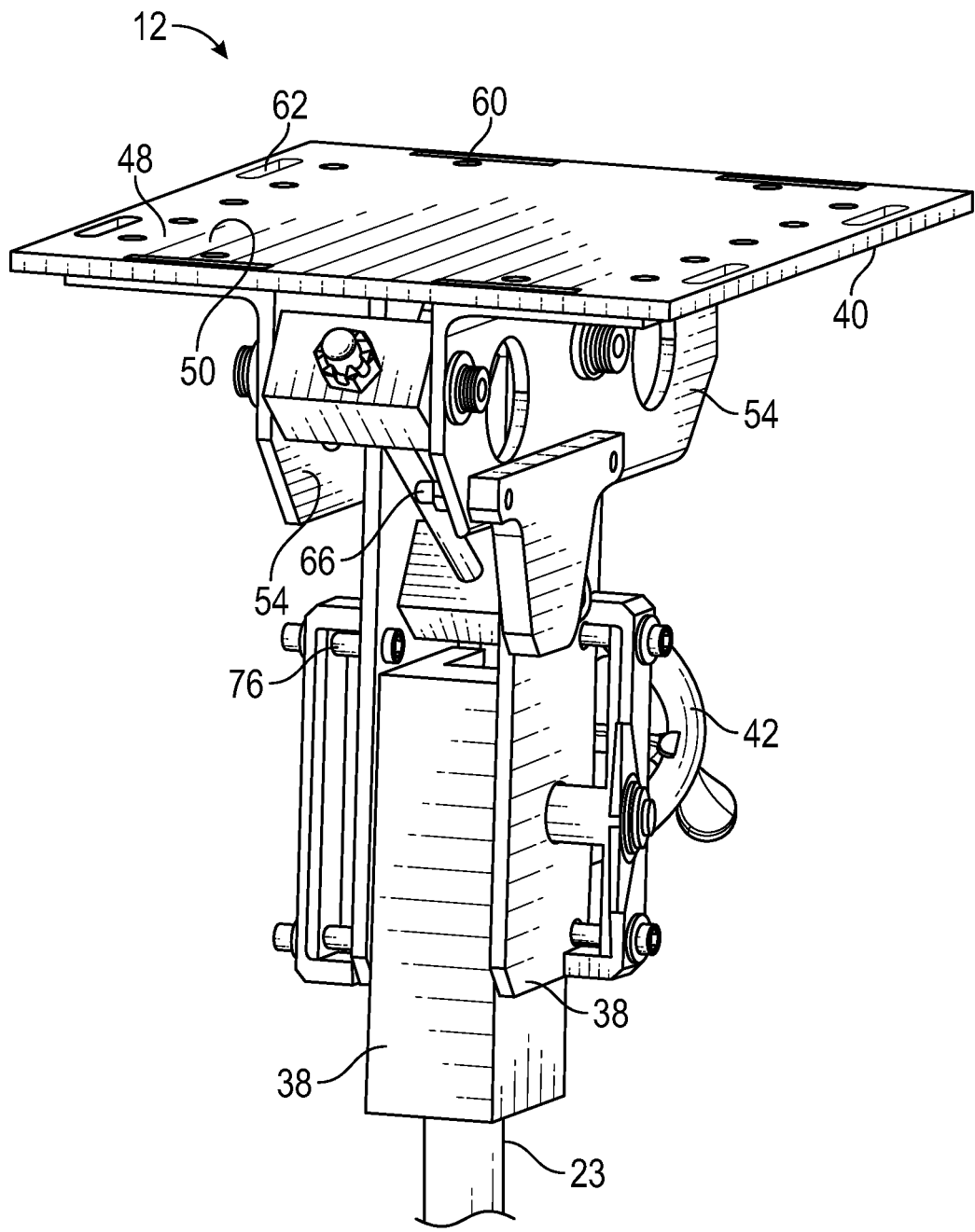
FIG. 13 illustrates a perspective view of a rotational tray assembly in accordance with an exemplary embodiment.

Referring to FIGS. 7B, 11A, and 13, in an exemplary embodiment, the index plate 64 and the clamps 72 are removably coupled to the plate 48 of the platform subassembly 40. When not in use, the index plate 64 and the clamps 72 can be removed from the plate 48 and stored on the rotational tray assembly 12. As illustrated, the support beam 54 includes openings 170 that receive the positive features 66 of the index plate 64 to store the index plate on the support beam 54. Additionally, the support subassembly 38 includes openings 172 that receive the positive features 76 of the clamps 72 to store the clamps 72 on the support subassembly 38.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An apparatus for positioning an object adjacent to an aircraft, the apparatus comprising:
    a rotational tray assembly including:
        a support subassembly that includes a support block and first and second support plates that are coupled to opposing sides of the support block and that extend away from the support block to first and second end portions of the first and second support plates, respectively;
        a platform subassembly pivotally coupled to the support subassembly and configured to support the object; and
        a drive screw subassembly operatively coupled to the platform subassembly and the support subassembly to move the platform subassembly relative to the support subassembly, the drive screw subassembly including a threaded rod disposed between the first and second support plates, wherein the support block has a clearance relief formed therein that provides clearance between the threaded rod and the support block as the threaded rod moves the platform subassembly relative to the support subassembly, and wherein the rotational tray assembly is configured to couple to a lift to position the rotational tray assembly adjacent to the aircraft.

2. The apparatus of claim 1, wherein the platform subassembly includes:
    a plate having an upper surface for supporting the object and a lower surface that is disposed on a side opposite the upper surface; and
    at least one support beam disposed adjacent to the lower surface and coupled to the plate.

3. The apparatus of claim 2, wherein the plate has a plurality of openings formed therethrough for securing the object to the plate.

4. The apparatus of claim 3, further comprising at least one clamp that is configured to engage the object and that has at least one positive feature for disposing through at least one of the openings for securing the object to the plate, wherein the at least one positive feature is one of a threaded post and a fastener.

5. The apparatus of claim 3, further comprising at least one index plate that has at least one positive feature for disposing through at least one of the openings and that is configured to interface with the object to limit movement of the object relative to the plate when the platform subassembly moves relative to the support subassembly, wherein the positive feature is one of a threaded post and a fastener.

6. The apparatus of claim 3, wherein the plurality of openings includes a plurality of slots for receiving at least one strap for securing the object to the plate.

7. The apparatus of claim 2, wherein the at least one support beam has an intermediate section disposed between a first end section and a second end section, and wherein the intermediate section of the at least one support beam is pivotably coupled to the support subassembly.

8. The apparatus of claim 7, wherein the intermediate section of the at least one support beam is pivotally coupled to at least one of the first end portion of the first support plate and the second end portion of the second support plate.

9. The apparatus of claim 8, wherein the drive screw subassembly is coupled to at least one of the first support plate and the second support plate, and wherein the drive screw subassembly is coupled to the first end section of the at least one support beam.

10. The apparatus of claim 9, wherein the threaded rod has an intermediate rod section that is disposed between a first rod end section and a second rod end section, and wherein the drive screw subassembly further includes:
   a first block disposed about the first rod end section and coupled to the first end section of the at least one support beam; and
   a second block spaced apart from the first block and disposed about the intermediate rod section, wherein the second block is coupled to at least one of the first support plate and the second support plate of the support subassembly.

11. The apparatus of claim 10, wherein the first block has a first block opening formed therethrough with the first rod end section disposed therein, and wherein the threaded rod is configured to rotate about a longitudinal axis and the second block has a threaded wall defining a second threaded block opening and the threaded rod engages the threaded wall when rotated about the longitudinal axis to advance the threaded rod through the second threaded block opening in a direction opposite the first block to move the platform subassembly relative to the support subassembly.

12. The apparatus of claim 11, wherein the intermediate section of the at least one support beam is pivotally coupled to at least one of the first end portion of the first support plate and the second end portion of the second support plate about a pivot point axis, and wherein rotating the threaded rod about the longitudinal axis rotates the platform subassembly about the pivot point axis.

13. The apparatus of claim 11, wherein the drive screw subassembly further includes a manual drive element coupled to the second rod end section and configured to be manually moved to rotate the threaded rod about the longitudinal axis.

14. The apparatus of claim 8, wherein the rotational tray assembly further includes a support structure having a first section coupled to the support block of the support subassembly and a second section configured to couple to the lift.

15. The apparatus of claim 14, wherein the support structure is removably coupled to the support block.

16. An apparatus for positioning an object adjacent to an aircraft, the apparatus comprising:
   a rotational tray assembly including:
      a support subassembly that includes a support block and first and second support plates that are coupled to opposing sides of the support block and that extend away from the support block to first and second end portions of the first and second support plates, respectively;
      a platform subassembly pivotally coupled to the support subassembly and configured to support the object; and
      a drive screw subassembly operatively coupled to the platform subassembly and the support subassembly to move the platform subassembly relative to the support subassembly, the drive screw subassembly including a threaded rod disposed between the first and second support plates, wherein the support block has a clearance relief formed therein that provides clearance between the threaded rod and the support block as the threaded rod moves the platform subassembly relative to the support subassembly; and
   a support structure coupled to the support subassembly and extending therefrom from in a direction away from the platform subassembly; and
   a lift coupled to the support structure and configured to vertically move the rotational tray assembly.

17. The apparatus of claim 16, wherein the support structure is removably coupled to the lift.

18. The apparatus of claim 16, wherein the lift includes a pivot arm configured to move vertically and having a distal end section that includes a holding member with an opening formed therethrough, and wherein the support structure is configured as an elongated element that is disposed through the opening of the holding member.

* * * * *